United States Patent
Mizusugi et al.

(10) Patent No.: US 6,668,589 B1
(45) Date of Patent: Dec. 30, 2003

(54) METHOD OF SHAPING SHEET GLASS

(75) Inventors: Tetsuya Mizusugi, Tokyo (JP); Kazunori Yuki, Tokyo (JP); Mitsuo Tanaka, Saitama (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 08/858,116

(22) Filed: May 19, 1997

Related U.S. Application Data

(63) Continuation of application No. 08/548,418, filed on Oct. 26, 1995, now abandoned, which is a continuation of application No. 08/204,536, filed on Mar. 2, 1994, now abandoned.

(30) Foreign Application Priority Data

Mar. 2, 1993 (JP) .............................................. 5-041203

(51) Int. Cl.⁷ .......................................... C03B 23/035
(52) U.S. Cl. .......................................... 65/106; 65/273
(58) Field of Search .................................... 65/106, 273

(56) References Cited

U.S. PATENT DOCUMENTS

| | | | | |
|---|---|---|---|---|
| 3,846,104 A | * | 11/1974 | Seymour | 65/104 |
| 4,229,200 A | * | 10/1980 | Seymour | 65/106 |
| 4,470,835 A | | 9/1984 | Fecik et al. | 65/106 |
| 4,483,702 A | | 11/1984 | Frank et al. | 65/273 |
| 4,511,386 A | | 4/1985 | Kellar et al. | 65/273 |
| 4,609,391 A | * | 9/1986 | McMaster | 65/104 |
| 4,661,141 A | | 4/1987 | Nitschke et al. | 65/273 |
| 4,746,348 A | | 5/1988 | Frank | 65/104 |
| 4,859,225 A | * | 8/1989 | Kuster et al. | 65/104 |
| 5,352,263 A | * | 10/1994 | Kuster et al. | 65/106 |

FOREIGN PATENT DOCUMENTS

| | | | | |
|---|---|---|---|---|
| EP | 0 237 231 | | 9/1987 | |
| EP | 0 373 265 | | 6/1990 | |
| FR | 2 536 062 | | 5/1984 | |
| FR | 2 546 503 | | 11/1984 | |
| FR | 2 546 507 | | 11/1984 | |
| JP | 63-27443 | * | 2/1988 | |
| WO | WO89/10330 | * | 11/1989 | 65/273 |

* cited by examiner

*Primary Examiner*—Sean Vincent
(74) *Attorney, Agent, or Firm*—Merchant & Gould, P.C.

(57) ABSTRACT

A suction mold has a central suction chamber having a flat shaping surface area and a pair of opposite side suction chambers disposed one on each side of the central suction chamber and having respective curved shaping surface areas. First, a vacuum is developed in the central suction chamber to attract a central area of the sheet of glass against the flat shaping surface area thereof, and then a vacuum is developed in the opposite side suction chambers to attract opposite side areas of the sheet of glass respectively against the curved shaping surface areas.

5 Claims, 5 Drawing Sheets

METHOD OF SHAPING SHEET GLASS

This is a Continuation of application Ser. No. 08/548,418, Oct. 26, 1995 now abandoned which is a Continuation of application Ser. No. 08/204,536, filed Mar. 2, 1994 now abandoned.

BACKGROUND OF THE INVENTION

1. Field of the Invention

The present invention relates to a method of shaping a sheet of glass with a suction mold.

2. Description of the Prior Art

There has heretofore been known a method of bending a sheet of glass by drawing, under suction, the sheet of glass that has been heated nearly to a softening point thereof against the surface of a suction mold for thereby shaping the sheet of glass complementarily to the surface configuration of the suction mold. Such a method is disclosed in Japanese laid-open patent publication No. 62-270429 and Japanese patent publication No. 62-30136.

According to the method disclosed in the former publication, a heated sheet of glass is floated by air and pressed against the shaping surface of a suction mold, and then a vacuum is developed by the suction mold to draw the heated sheet of glass against the shaping surface of the suction mold to bend the heated sheet of glass to a desired shape complementary to the shaping surface.

According to the method disclosed in the latter publication, a heated sheet of glass is lifted by a ring mold and pressed against the shaping surface of a suction mold, and then a vacuum is developed by the suction mold to draw the heated sheet of glass against the shaping surface of the suction mold to bend the heated sheet of glass to a desired shape complementary to the shaping surface.

In the above prior arrangements, a large amount of air may flow into the suction mold through suction holes that are defined in the region of the suction mold which is positioned out of intimate contact with the glass sheet, thereby reducing the forces with which the glass sheet is held against the shaping surface under suction.

To solve the above problem, a suction mold is divided into a plurality of chambers, and different suction pressures are developed in the respective chambers according to other conventional arrangements disclosed in Japanese laid-open utility model publication No. 63-27443 and Japanese laid-open patent publication No. 59-232926. These disclosed suction molds also suffer disadvantages because suction pressures are simultaneously developed in the chambers.

More specifically, FIG. 8A the accompanying drawings shows a conventional suction mold 100 having a downwardly convex shaping surface. In FIG. 8A, a heated glass sheet G has its peripheral edge pressed against the peripheral edge of the shaping surface of the suction mold 100 by a ring mold 101. When the suction mold 100 starts drawing the heated glass sheet G under suction pressures developed therein, air may locally be not removed from and may remain trapped between the glass sheet G and the shaping surface of the suction mold 100, as shown in FIG. 8B of the accompanying drawings. When this happens, the glass sheet G has an inversely curved region which will cause poor reflective distortions on the bent glass sheet.

FIG. 9A of the accompanying drawings shows another conventional suction mold 110 of the reversal type having a concave/convex shaping surface. In FIG. 9A, a heated glass sheet G has its peripheral edge pressed against the peripheral edge of the shaping surface of the suction mold 110. When the suction mold 110 starts drawing the heated glass sheet G under suction pressures developed therein, the heated glass sheet G may not be stretched sufficiently, and may be ruptured as shown in FIG. 9B of the accompanying drawings.

SUMMARY OF THE INVENTION

It is therefore an object of the present invention to provide a method of shaping a sheet of glass accurately to a desired shape with a suction mold, without trapping air between the sheet of glass and the shaping surface of the suction mold, or rupturing the sheet of glass or developing undue stresses in the sheet of glass.

According to the present invention, there is provided a method of shaping a sheet of glass heated nearly to a softening point thereof with the shaping surface areas of a plurality of divided suction chambers defined in a suction mold, the shaping surface areas having suction holes defined therein, comprising the steps of introducing a vacuum into one of the suction chambers to attract an area of the sheet of glass against the shaping surface area of the one of the suction chambers through the suction holes thereof, and thereafter, introducing a vacuum into another of the suction chambers to attract another area of the sheet of glass against the shaping surface area of the other of the suction chambers through the suction holes thereof.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
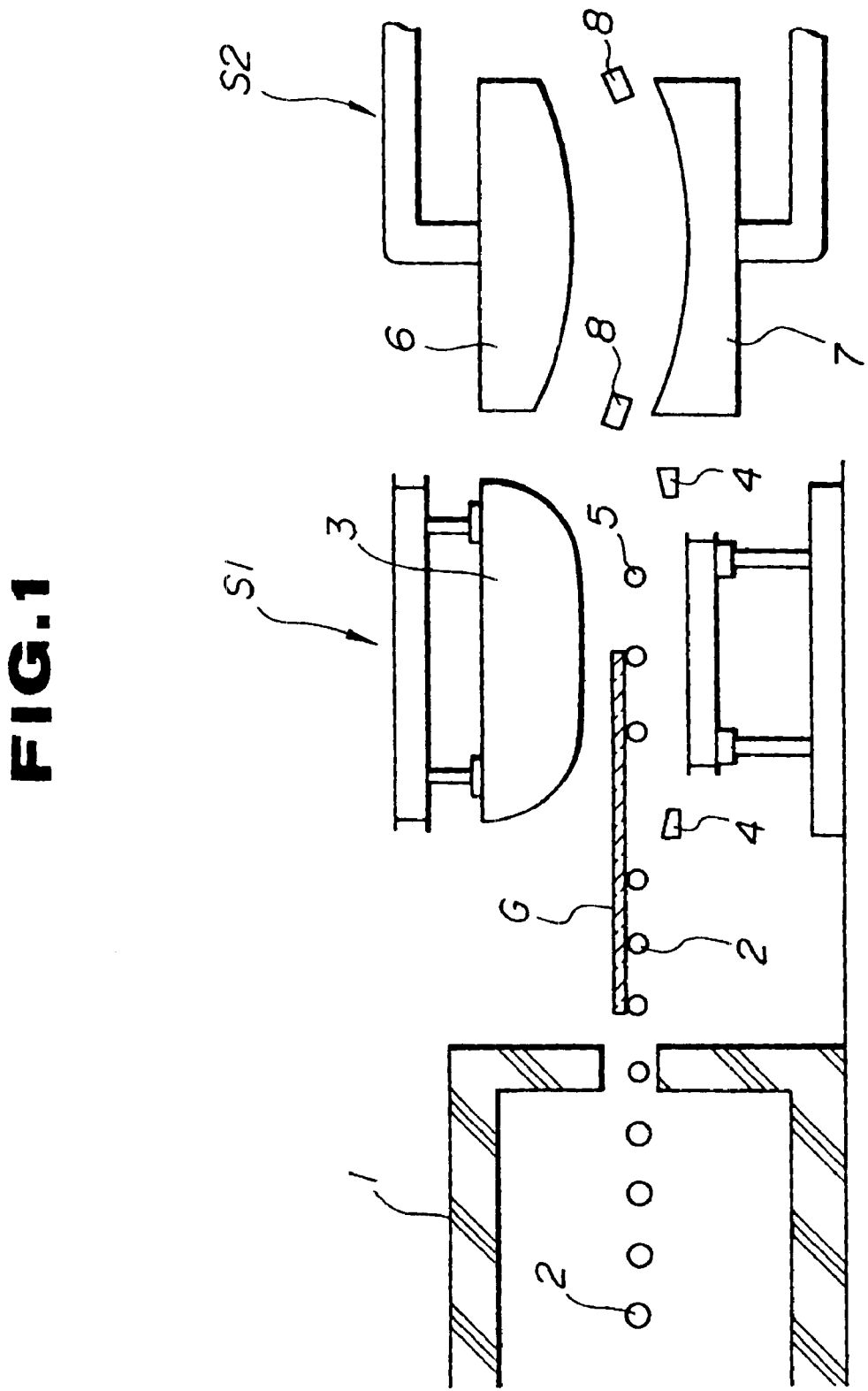
FIG. 1 is a schematic side elevational view of an apparatus for carrying out a method of bending a sheet of glass according to the present invention.

As shown in FIG. 1, an apparatus for carrying out a method of shaping a sheet of glass according to the present invention includes a tunnel-shaped heating furnace 1 for heating a sheet of glass G to be bent to a desired shape. The apparatus also includes a shaping stage S1 positioned downstream of the heating furnace 1 and a quenching stage S2 positioned downstream of the shaping stage S1 with respect to the direction in which the heated glass sheet G is conveyed.

An array of conveyor rollers 2 is disposed in the heating furnace 1 and arranged from the heating furnace 1 to the shaping stage S1. The shaping stage S1 includes a vertically movable upper suction mold 3 and a vertically movable lower ring mold 4 which is disposed below the upper suction mold 3. The shaping stage S1 also includes an array of vertically movable rollers 5 in the ring mold 4.

The quenching stage S2 includes a pair of upper and lower quenching boxes 6, 7 vertically spaced from each other for ejecting cooling air to a space therebetween, and a quenching ring 8 disposed between the upper and lower quenching boxes 6, 7. The quenching ring 8 is reciprocally movable between the shaping stage S1 and the quenching stage 52.

Figure 2:
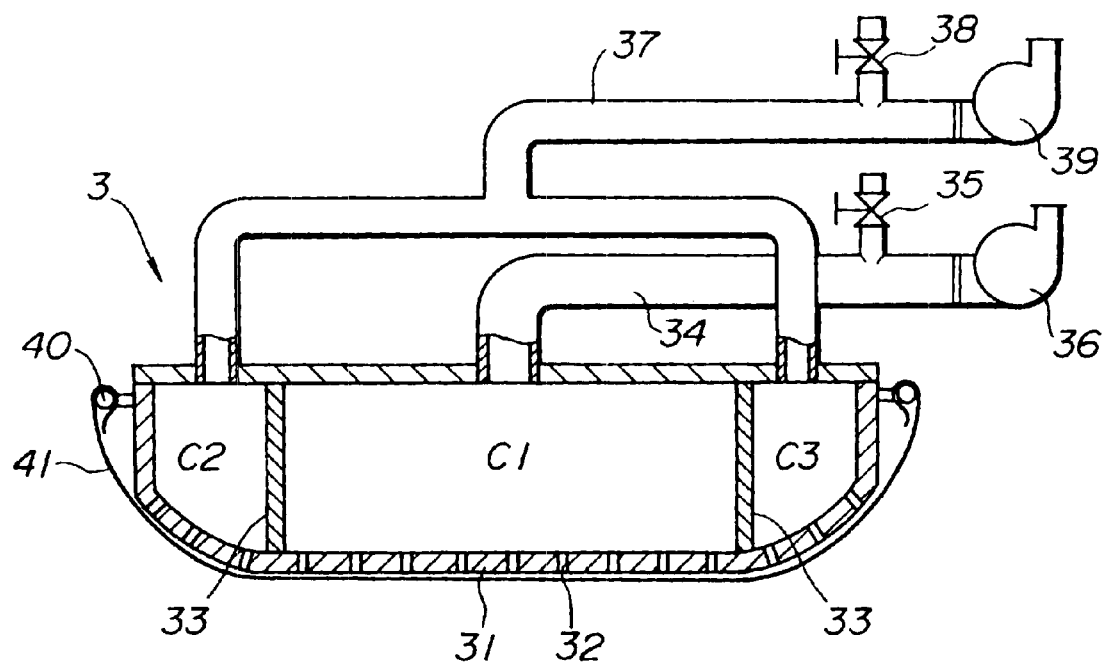
FIG. 2 is a cross-sectional view of a suction mold of the apparatus shown in FIG. 1.
Figure 3:
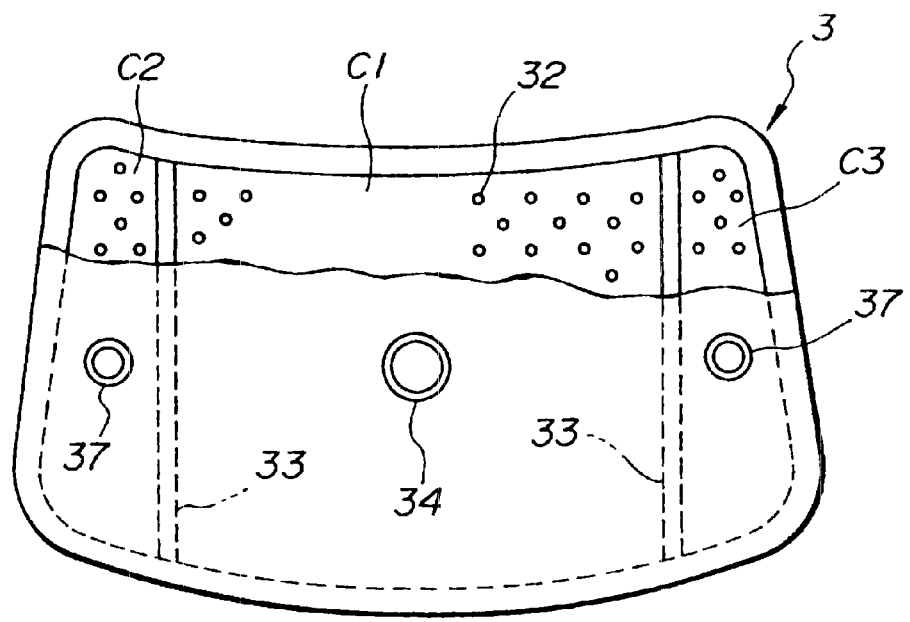
FIG. 3 is a plan view, partly broken away, of the suction mold shown in FIG. 2.

As shown in FIGS. 2 and 3, the suction mold 3 comprises a hollow box including a downwardly convex lower shaping surface 31 which has a plurality of suction holes 32 defined therethrough in communication with the interior space of the suction mold 3. The interior space of the suction mold 3 is divided into a plurality of suction chambers C1, C2, C3 by a pair of partitions 33. The suction chamber C1 is positioned centrally between the suction chambers C2, C3 which are located in opposite side portions of the suction mold 3. The suction chamber C1 has a substantially flat bottom panel which serves as a central flat area of the shaping surface 31, and the suction chambers C2, C3 have arcuate bottom panels which serve as respective opposite curved areas of the shaping surface 31.

The central suction chamber C1 is connected to a vacuum generating device 36 through a duct 34 equipped with a valve 35, and the side suction chambers C2, C3 are connected to a vacuum generating device 39 through a duct 37 equipped with a valve 38. The ducts 34, 37 are connected to the suction chambers C1, C2, C3 at an upper panel of the suction mold 3.

The shaping surface 31 is covered with a surface layer 41 made of glass or metal cloth which has opposite ends locked on hooks 40 mounted respectively on the opposite ends of the suction mold 3 near its upper panel. The surface layer 41 serves to prevent the suction holes 32 from leaving their marks on the glass sheet G when the glass sheet G is shaped by the shaping surface 31.

Operation of the apparatus shown in FIGS. 1 through 3 to carry out the method according to the present invention will be described below.

While the glass sheet G is moving in the heating furnace 1 by the conveyor rollers 2, the glass sheet G is heated nearly to its softening point. The heated glass sheet G is conveyed out of the heating furnace 1 by the conveyor rollers 2, and then transferred from the conveyor rollers 2 onto the rollers 5 in the ring mold 4.

Thereafter, the rollers 5 are lowered to place the glass sheet G on the ring mold 4. At the same time, the suction mold 3 is lowered toward the ring mold 4. Before the suction mold 3 starts descending, the valves 35, 38 are open, and no suction pressure is imposed on the shaping surface 31 of the suction mold 3. When the suction mold 3 starts moving downwardly, however, the valve 35 is closed to develop a vacuum in the central suction chamber C1 with the vacuum generating device 36, applying a suction force to the flat area of the shaping surface 31 which corresponds to the central suction chamber C1.

Figure 4:
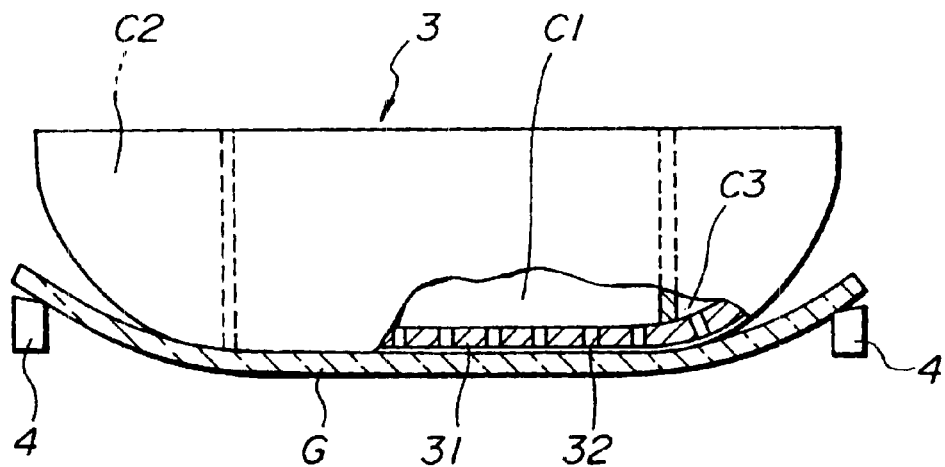
FIG. 4 is a cross-sectional view, partly broken away, of the suction mold in a certain phase of a process of bending a sheet of glass.

The suction mold 3 is continuously lowered until it nears its lowermost position, i.e., the shaping surface 31 approaches the glass sheet G on the ring mold 4, the central area of the glass sheet G is attracted to the area of the shaping surface 31 which corresponds to the central suction chamber C1 under the vacuum developed in the central suction chamber C1, as shown in FIG. 4.

In the illustrated embodiment, since the shaping surface 31 comprises a downwardly convex shaping surface, the vacuum is first created in the central suction chamber C1 so that the suction mold 3 first attracts the central area of the glass sheet G. If the suction mold 3 is of the reversal type including convex and concave shaping surfaces, then a vacuum is first created in a suction chamber corresponding to the concave shaping surface to attract an area of a glass sheet against the concave shaping surface.

Figure 5:
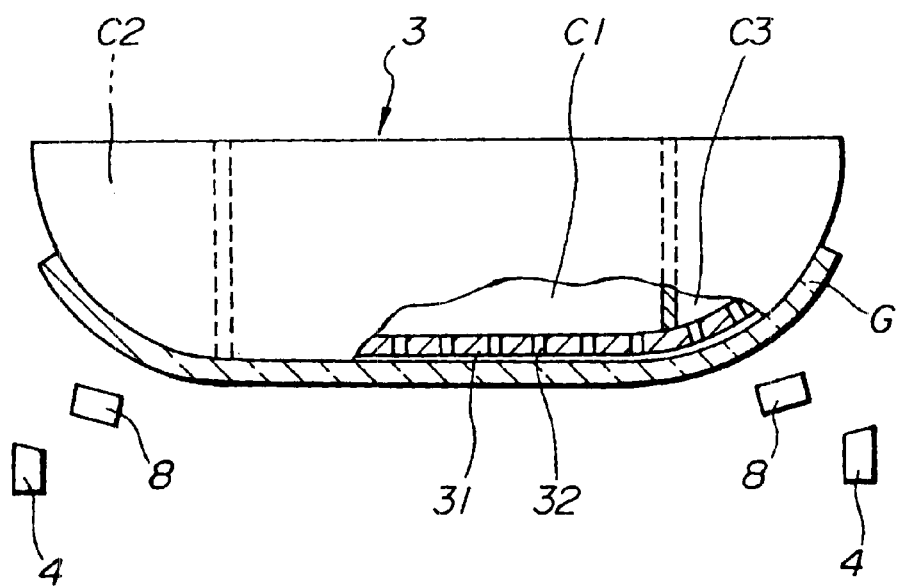
FIG. 5 is a cross-sectional view, partly broken away, of the suction mold in another phase of the process of bending a sheet of glass.

At the same time that the central area of the glass sheet G in attracted, the valve 38 is closed to apply a vacuum developed by the vacuum generating device 39 into the side suction chambers C2, C3. Therefore, opposite side areas of the glass sheet G are attracted to respective opposite side areas of the shaping surface 31 which correspond to the side suction chambers C2, C3. Consequently, the glass sheet G is now bent complementarily to the downwardly convex shaping surface 31 as shown in FIG. 5.

Since a vacuum or suction pressure is developed at different times in the central and side suction chambers C1, C2, C3, the glass sheet G is bent successively and gradually from one area to another, i.e., from the central area to the side areas thereof. Consequently, when the glass sheet G is bent, no air is trapped between the shaping surface 31 and the glass sheet G, and the glass sheet G is prevented from being ruptured or developing undue stresses therein, but can be bent accurately to a desired shape.

Thereafter, the suction mold 3 with the glass sheet G attracted thereto is elevated, and then the quenching ring 8 is introduced below the elevated suction mold 3 and above the ring mold 4. The valves 35, 38 are opened to release the glass sheet G from the suction mold 3 onto the quenching ring 8. The quenching ring 8 which has received the glass sheet G thereon is then moved into the quenching stage S2 and positioned between the quenching boxes 6, 7. Now, cooling air is applied from the quenching boxes 6, 7 to the glass sheet G to quench the glass sheet G.

FIGS. 6A through 6D show different suction molds which can be used in the method according to the present invention.

Figure 6A:
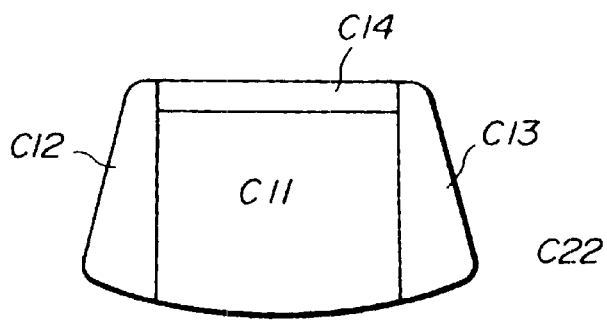
FIGS. 6A through 6D are cross-sectional views of other suction molds which can be used in the method according to the present invention.
Figure 6B:
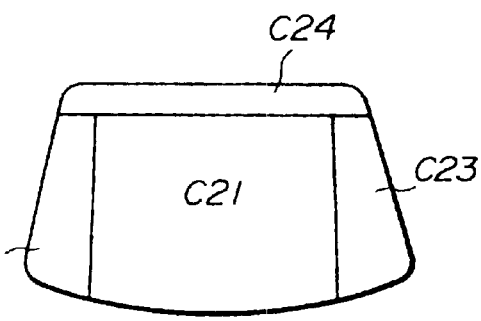
Figure 6C:
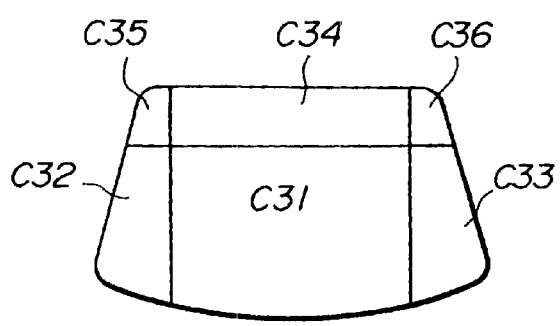
Figure 7A:
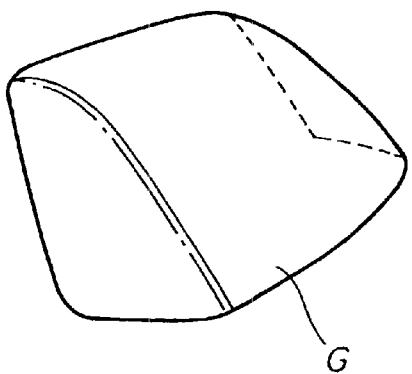
FIGS. 7A and 7B are perspective views of sheets of glass that can be shaped by the suction molds shown in FIGS. 6A through 6D.

The suction molds shown in FIGS. 6A through 6C are suitable for shaping a glass sheet G having a cap-shaped upper portion as shown in FIG. 7A. The suction mold shown in FIG. 6A has a central chamber C11 positioned between a pair of side chambers C12, C13 and beneath an upper small chamber C14 which extends between the side chambers C12, C13. The suction mold shown in FIG. 6B has a central chamber C21 positioned between a pair of side chambers C22, C23 and beneath an upper small chamber C24 which extends over the central chamber C21 and the side chambers C22, C23. The suction mold shown in FIG. 6C has a central chamber C31 positioned between a pair of aide chambers C32, C33 and beneath an upper small chamber C34 which extends between upper small side chambers C35, C36 that are positioned respectively above the side chambers C32, C33.

Figure 6D:
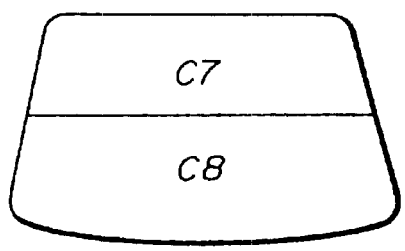
Figure 7B:
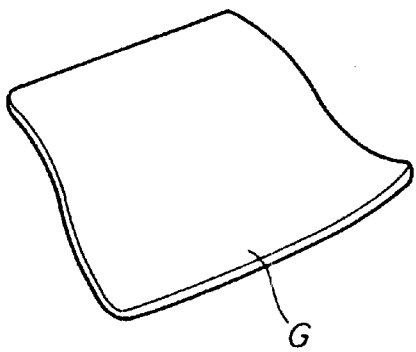
Figure 8A:
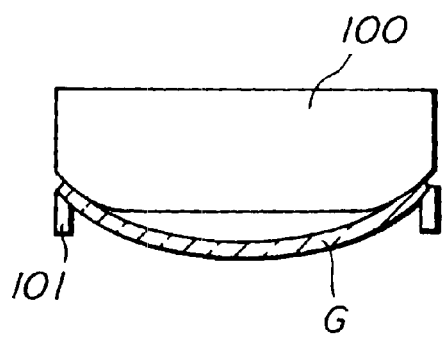
FIGS. 8A and 8B are views illustrative of a conventional method of bending a sheet of glass.
Figure 8B:
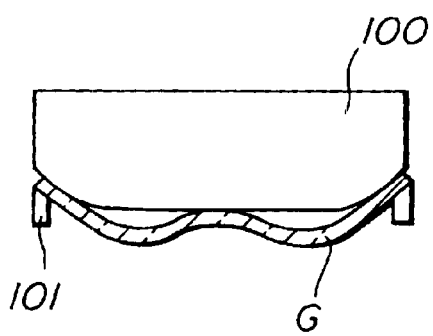
Figure 9A:
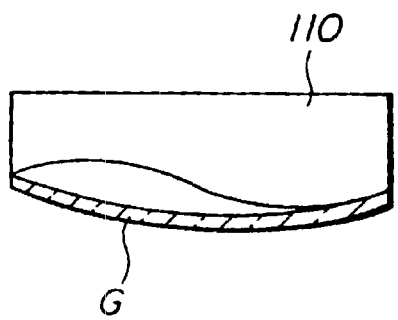
FIGS. 9A and 9B are views illustrative of another conventional method of bending a sheet of glass.
Figure 9B:
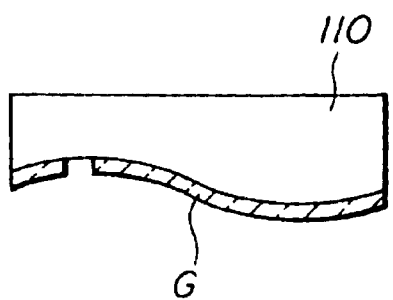

The suction mold shown in FIG. 6D is suitable for shaping a glass sheet G of the reversal type as shown in FIG. 7B. The suction mold shown in FIG. 6D has an upper chamber C7 and a lower chamber C8 disposed beneath the upper chamber C7.

While the method according to the present invention has been described particularly with respect to the illustrated apparatus, the principles of the present invention are applicable to any of various methods of shaping a sheet of glass insofar as they employ a suction mold.

The suction mold 3 used in the method according to the present invention may comprise a suction mold having a convex shaping surface, a suction mold having a concave surface, an upper suction mold, a lower suction mold, or a hanging press mold. The vacuum generating devices 36, 39 may comprise a blower, an ejector pump, a vacuum pump, a vacuum tank, or a combination of any of these vacuum generating devices. Furthermore, different vacuums or suction pressures may be developed in the respective suction chambers.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention in indicated by the appended claims rather than by the foregoing description.

What is claimed is:

1. A method of shaping a sheet of glass heated nearly to a softening point thereof with a suction mold including first and second suction chambers having respective first and second shaping surface areas, comprising the steps of:

placing the sheet of glass on a ring mold;

lowering said suction mold toward said ring mold to an extent that the first shaping surface area approaches the sheet of glass on said ring mold;

then shaping the sheet of glass accurately with said suction mold by developing a first vacuum in said first suction chamber at a first time to attract a first area of the sheet of glass against the first shaping surface area to shape the first area of the sheet of glass and then developing a second vacuum in said second suction chamber at a second time to attract a second area of the sheet of glass against the second shaping surface area to shape the second area of the sheet of glass complementary to the first area, said first time being before said second time so that the sheet of glass is successively brought against the first and second shaping surface areas wherein said sheet of glass is bent successively and gradually; and then without further shaping, directly releasing the sheet of glass from the first and second shaping surface areas of the suction mold onto a quenching ring and moving the sheet of glass on the quenching ring to quenching.

2. A method according to claim 1, wherein said sheet of glass includes a side area on each side of a central area therebetween, and wherein said suction mold includes a pair of said second shaping surface areas and said second suction chambers with one on each side of said first shaping surface area and said first suction chamber, respectively, said second shaping surface areas being curved, said developing a second vacuum step comprising said ring mold being maintained spaced from said curved second shaping surface areas while said second vacuum is developed in said second suction chambers, said side areas of the sheet of glass being attracted by the second vacuum and shaped against the curved second shaping surface areas.

3. A method according to claim 2, wherein said side areas of the sheet of glass are shaped successively from the central to the side areas.

4. A method according to claim 1, wherein said shaping surface areas further comprise a metal or glass cloth covering.

5. A method according to claim 1, wherein the sheet of glass is substantially planar prior to attracting it against the shaping surface areas.

\* \* \* \* \*